(12) United States Patent
Nair et al.

(10) Patent No.: US 8,201,011 B1
(45) Date of Patent: Jun. 12, 2012

(54) TIMING OPTIMIZATION FOR PATHS IN A PROCESSOR

(75) Inventors: Umesh M. Nair, Cupertino, CA (US); Timothy P. Johnson, Brisbane, CA (US)

(73) Assignee: Oracle America, Inc., Redwood City, CA (US)

( * ) Notice: Subject to any disclaimer, the term of this patent is extended or adjusted under 35 U.S.C. 154(b) by 1174 days.

(21) Appl. No.: 11/861,853

(22) Filed: Sep. 26, 2007

(51) Int. Cl.
| G06F 1/12 | (2006.01) |
| G06F 13/42 | (2006.01) |
| G06F 3/00 | (2006.01) |
| G06F 5/00 | (2006.01) |
| H04L 5/00 | (2006.01) |
| H04L 7/00 | (2006.01) |

(52) U.S. Cl. .......................... 713/401; 713/400; 710/61
(58) Field of Classification Search .................. 713/400, 713/401; 710/61
See application file for complete search history.

(56) References Cited

U.S. PATENT DOCUMENTS

| 5,539,349 A | * | 7/1996 | Roy ............................. 327/276 |
| 5,727,021 A | * | 3/1998 | Truebenbach ................ 375/226 |
| 6,009,248 A | | 12/1999 | Sato |
| 6,085,346 A | | 7/2000 | Lepejian |
| 6,205,564 B1 | | 3/2001 | Kim |
| 6,230,302 B1 | | 5/2001 | Gabele |
| 6,232,806 B1 | * | 5/2001 | Woeste et al. ................ 327/149 |
| 7,114,136 B2 | | 9/2006 | Chase |
| 7,236,411 B1 | * | 6/2007 | Saini et al. .................... 365/194 |
| 2003/0074609 A1 | * | 4/2003 | Koyanagi et al. ............. 714/700 |
| 2004/0250152 A1 | * | 12/2004 | Tajika et al. .................. 713/401 |
| 2008/0216036 A1 | | 9/2008 | Foreman |

* cited by examiner

*Primary Examiner* — Kim Huynh
*Assistant Examiner* — Brandon Kinsey
(74) *Attorney, Agent, or Firm* — Rory D. Rankin; Meyertons, Hood, Kivlin, Kowert & Goetzel

(57) ABSTRACT

A system and method for efficient timing optimization for asymmetric paths to replicated units. A microprocessor may include multiple instantiations of a processing core. Chip-level interconnects may have asymmetric routing paths to the multiple cores. The interconnect routes may need to be stable early in the design cycle and yet possess multiple timing paths to the multiple instantiated cores. Modifications to the input/output ports of the cores may provide the necessary timing requirements for the cores without dynamically altering the chip-level interconnects.

17 Claims, 4 Drawing Sheets

US 8,201,011 B1

TIMING OPTIMIZATION FOR PATHS IN A PROCESSOR

BACKGROUND OF THE INVENTION

1. Field of the Invention

This invention relates to computer systems, and more particularly, to finding an efficient method to achieve timing optimization for asymmetric paths to replicated units in an integrated circuit.

2. Description of the Relevant Art

In order to take advantage of instruction-level parallelism and increase throughput, conventional modern microprocessors execute multiple threads simultaneously. In addition, to further the effort, these microprocessors may include hardware for multiple-instruction issue, dispatch, and retirement; extra routing and logic to determine data forwarding for multiple instructions simultaneously per clock cycle; intricate branch prediction schemes, simultaneous multi-threading, out-of-order execution, register renaming techniques; and other design choices. Server applications, however, tend to possess poor branch predictability and require large amounts of memory, but little cache locality. Therefore, hardware designed to take advantage of instruction-level parallelism may increase area and power requirements without an appreciable return on performance for server microprocessors.

In order to reduce the complexity of the pipeline, but increase performance for server microprocessors, the design may not implement many of the above design techniques, but it may replicate a simpler core multiple times. A microprocessor with multiple cores, wherein each core supports multi-threaded execution may provide the needed performance for server applications without unnecessarily increasing power and area for the design. Reducing the design complexity and the operating frequency of each core makes it possible to use more static CMOS circuits and library cell designs, which results in shorter design cycles.

However, a massively parallel design, where each replicated unit or core has been designed and already meets both setup and hold timing at the unit-level, possesses chip-level asymmetric paths to the replicated cores. In order to meet timing requirements for each core, it is needed that each replicated core receives a same signal at near the same time. Long asymmetric chip-level routes make this design requirement difficult to meet. There is little time for modifications and chip-level real estate for delay buffers. Also, chip-level interconnects may need to be stable early in the design cycle in order to complete interconnect analysis and fix related issues. Timing closure needs to be achieved without dynamically changing the chip-level interconnects.

In view of the above, an efficient method for achieving timing optimization for asymmetric paths to replicated units is desired.

SUMMARY OF THE INVENTION

Systems and methods for achieving timing optimization for asymmetric paths to replicated units are disclosed. In one embodiment, an integrated circuit consists of a server microprocessor that may be coupled to memory, peripheral devices, and a bus and/or network. The server microprocessor may comprise multiple cores, wherein each core needs to meet setup and hold timing requirements within itself. In order to meet chip-level timing, each core may need a chip-level signal to arrive at near the same time at a port of each instantiated core.

Each input/output port of an instantiated core may have isolation buffers. These buffers may be modified to become isolation multiplexer (mux) cells. These cells may be controlled to provide a delayed or non-delayed version of a chip-level signal to the core.

Alternatively, if a mux cell delay is too great for an instantiated core to utilize, then a smaller delay element may be implemented at the port. Two additional ports may be created where one is for a delayed version of the chip-level signal and a second is for a non-delayed version of the chip-level signal. A jumper connection on one of several metal layers may be used to provide the same connectivity as the mux cell solution without incorporating a mux cell delay.

Figure 1:
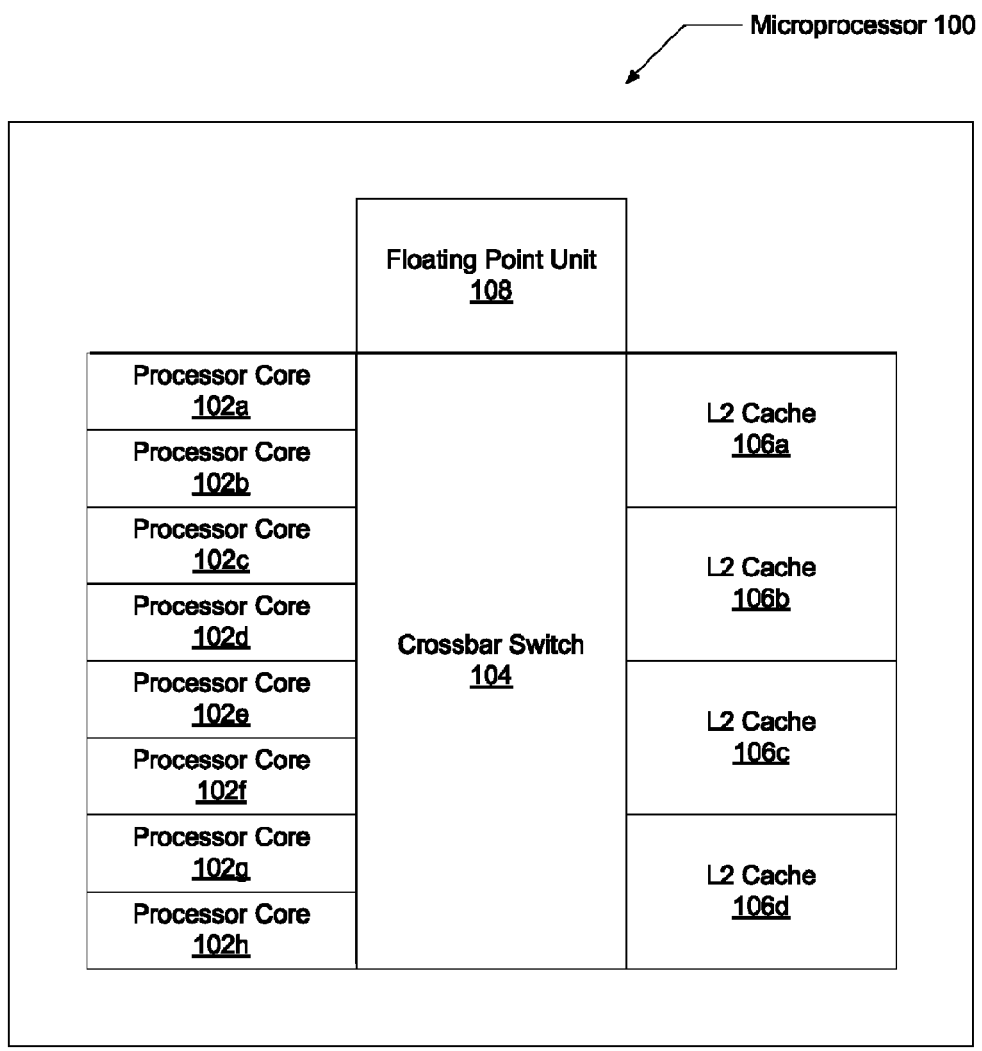
FIG. 1 is a generalized block diagram illustrating one embodiment of a microprocessor with multiple instantiated cores.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

Referring to FIG. 1, one embodiment of a microprocessor 100 with multiple instantiated cores 102a-102h is shown. Microprocessor 100 may be used for server applications, which tend to possess poor branch predictability and require large amounts of memory, but little cache locality. Microprocessor 100 has eight instantiations of a processor core 102a-102h. As used herein, elements referred to by a reference numeral followed by a letter may be collectively referred to by the numeral alone. For example, processor cores 102a-102h may be collectively referred to as processor cores 102. Each processor core 102 may forego the use of design techniques used in conventional processors such as complex branch prediction schemes, out-of-order execution, and register renaming techniques. Each processor core 102 may support execution of multiple threads. Multiple instantiations of a same processor core 102 able to execute multiple threads may provide high throughput execution of server applications while maintaining power and area savings.

Each core 102 may contain its own L1 cache in order to reduce latency. A crossbar switch 104 may provide communication between the cores 102 and L2 caches 106. In addition, cores 102 may be coupled to double data rate dual in-line memory modules (DDR DIMM) that reside on a circuit board outside microprocessor 100. In one embodiment, DDR DIMM channel(s) may be on-chip in order to couple the cores 102 to the DDR DIMM off-chip. Each L2 cache 106 may be coupled to a memory controller or a dynamic random access memory (DRAM) channel for communication to DRAM that resides off-chip. Also, an interface to a system bus may be coupled to the each L2 cache 106.

A floating-point unit 108 may be provided for floating-point operations such as addition, subtraction, multiplication, division, and square-root. Unit 108 may be used for applications such as scientific and/or technical simulations and modeling programs. Alternatively, a floating-point unit 108 may be included in each core 102. Additionally, a clock unit, a test unit, and other control logic may be included in microprocessor 108.

In other embodiments, microprocessor 100 may have a different topology. Regardless of a specific topology, due to different distances to each instantiation of the cores 102, a same chip-level interconnect signal may involve various arrival times to the cores 102. It may be desired that the chip-level interconnect signals be routed early in a design cycle and remain unchanged. However, each instantiation of a design such as core 102 requires one timing specification for each input signal.

A problem arises when a same chip-level interconnect signal arrives at different times to each core 102 and this signal may not have the routing modified. For example, if a signal originates from the bottom of microprocessor 100, it may have a very different arrival time between core 102h and core 102a. With a different topology that may place four cores 102 on either side of crossbar switch 104, an interconnect signal may still experience very different arrival times between two cores 102.

Figure 2:
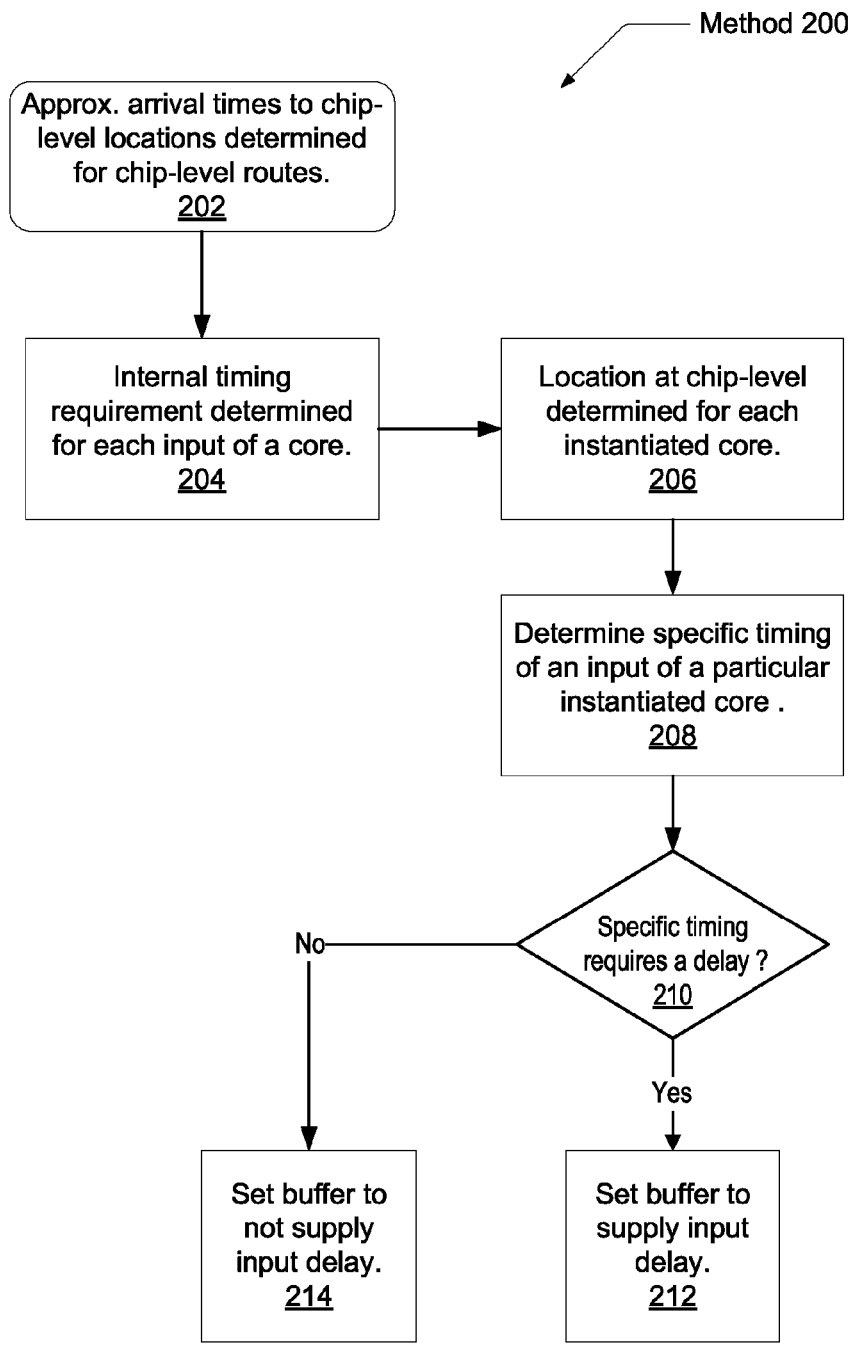
FIG. 2 is a flow diagram of one embodiment of a method for efficient timing optimization for asymmetric paths to replicated units.

Turning now to FIG. 2, one embodiment of a flow diagram for a method 200 for performing timing optimization for instantiated units or cores is shown. The steps in this embodiment are shown in sequential order. However, some steps may occur in a different order than shown, some steps may be performed concurrently, some steps may be combined with other steps, and some steps may be absent in another embodiment. In the embodiment shown, chip-level routes are done after floorplanning of the chip has become somewhat stable in block 202. Preferably this routing does not change or experience many modifications in order to shorten the chip design cycle.

A core is designed to meet functional specifications and to fulfill timing closure requirements in block 204. Approximate arrival times for input signals are based on the completed chip-level routing of interconnect signals. These approximations are tuned to finer values upon completion of the timing closure for the core. The timing requirements may include setup and hold time requirements of storage elements in a core and may further include computational paths between storage elements that complete within a half or a full clock cycle at the desired clock frequency.

Each core may be instantiated multiple times on the chip according to floorplanning requirements in block 206. Depending on the location of a particular instantiated core, the arrival time of a particular interconnect signal may vary from the arrival time of the same interconnect signal to a different instantiated core. For example, four cores may be instantiated next to one another in a vertical manner and a driver for an interconnect signal at chip-level may be located near the bottom instantiated core. That particular interconnect signal will arrive to the bottom core first and to the top core last. The difference between arrival times may be appreciable and now the timing of that signal within the cores may be different between two, three, or all four cores in this example.

The previous work performed to design the cores and meet timing closure requirements now may not be satisfied. However, if a calculated delay was included in the path of the interconnect signal to the bottom-most cores, the interconnect signal may arrive to the four cores at approximately the same time (decision block 210). Then the requirements of the previous timing closure work may be satisfied once again.

However, the cores are already designed and the entire design cycle may be quickened by instantiating four cores versus designing four different cores. Therefore, a change may not be performed within the interior design (e.g. circuitry for the logic and storage of values) of the core. Again, in order to shorten the entire design cycle of the chip, the chip-level routing may need to be completed and stable early in the design cycle. Therefore adding buffers or changing the routing at the time the cores are completed and instantiated may not be an option. In order to ensure approximately equal arrival times of the interconnect signal to the different cores, the cores may include an input buffer with controllable circuitry.

For example, a predetermined delay found from timing analysis may be induced at the port by one or more delay elements. Each core may require a decision-making element for each port that may provide the two versions of a signal. The selection mechanism for the decision-making element may be routed at the time the core is instantiated. Each selection mechanism may require a different value depending on the location on the die of the particular instantiated core. Now the only modification performed once timing analysis at the core-level is completed is the routing of this selection mechanism at the time of instantiation. The chip-level interconnect routing and interior design of the instantiated cores remain unchanged.

This controllable circuitry may choose between supplying a delayed version of the interconnect signal to the core and a non-delayed version. The delay may be determined from timing analysis as discussed above. Each core may include the same buffers at their pins. In order to select between versions of the signal, a simple additional connection to chip-level power or ground to the buffer may need to be made. If an instantiated core is located near the driver of an interconnect signal, the core may need a delayed version of the signal (block 212). If an instantiated core is located far from the driver of an interconnect signal, the core may need a non-delayed version of the signal (block 214). Then the arrival times of the signal to each of these cores may be approximately the same.

Furthermore, the delay provided by one or more delay elements and a decision-making element may be too large for a particular instantiated core. A design with another embodiment of the decision-making element that provides a smaller delay may be needed for these cores.

Figure 3:
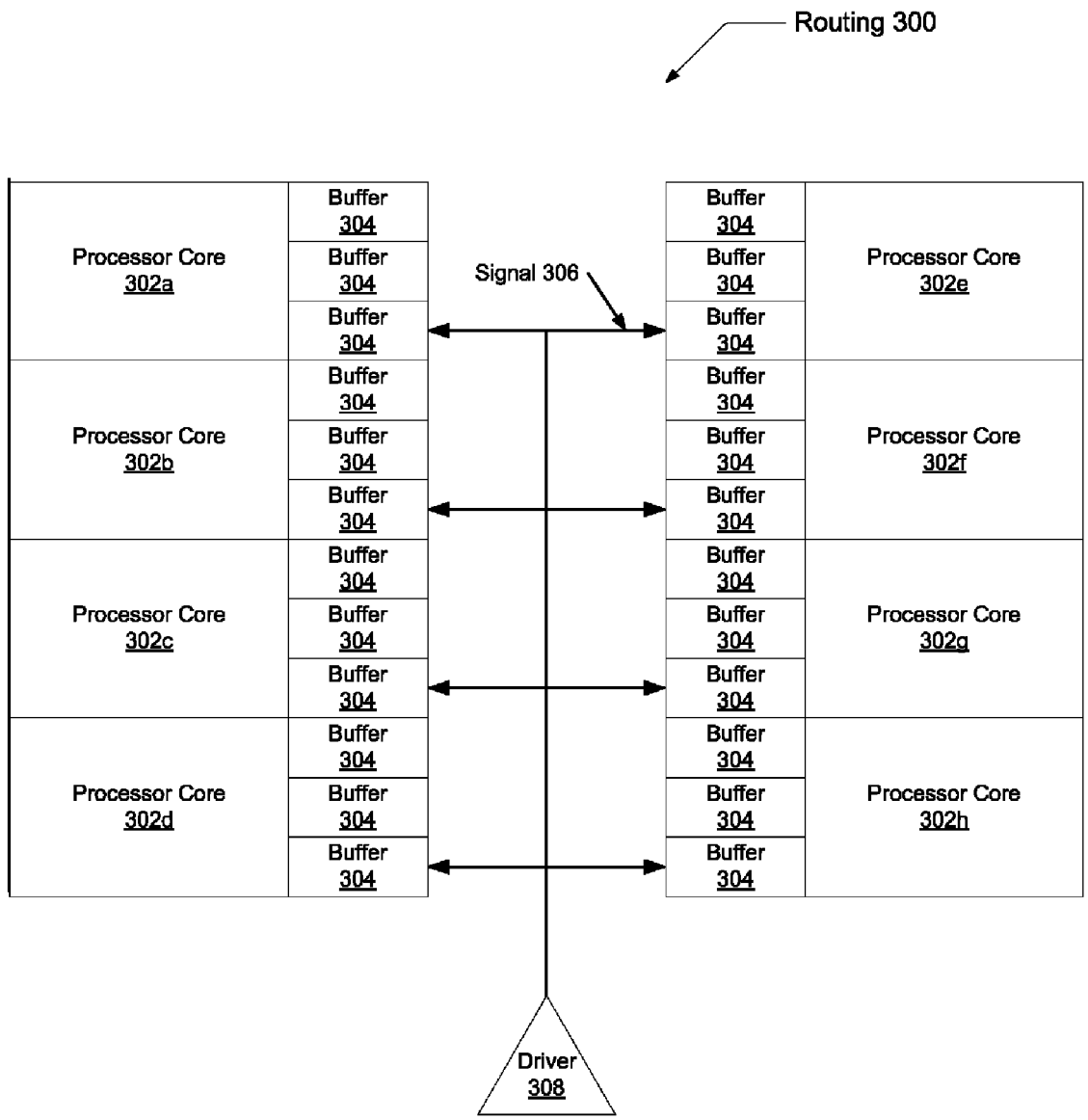
FIG. 3 is a generalized block diagram illustrating chip-level signal routing.

Referring to FIG. 3, a generalized block diagram of chip-level signal routing is shown. In one embodiment, eight cores 302 may be instantiated on a die with the topology shown. Each core may include input buffers 304 that receive a chip-level interconnect signal 306. The signal 306 may be driven by a chip-level driver 308 on the die or alternatively within another block on the die. Each buffer 304 may also have an additional pin for selection purposes. This additional pin may be connected to the chip-level power or ground in order to provide a delayed version of signal 306 to a particular core 302 or a non-delayed version.

Figure 4A:
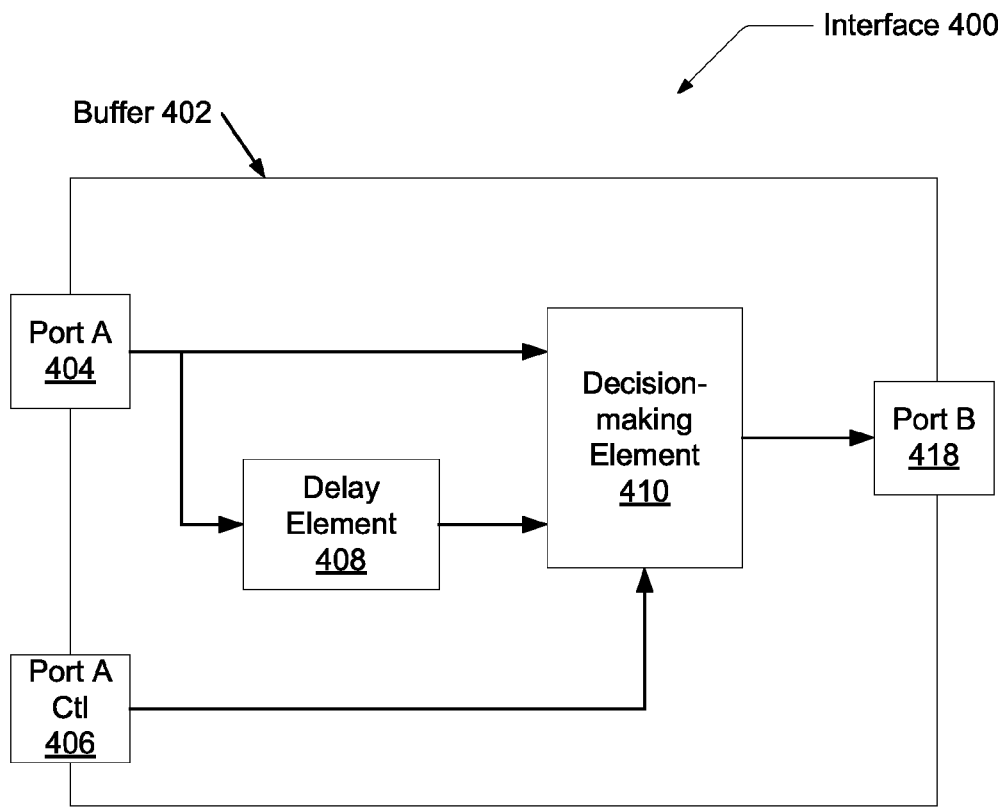
FIG. 4A is a generalized block diagram illustrating one embodiment of an input port with a decision-making element delay.

FIG. 4A illustrates one embodiment of a general block diagram of an interface 400 for an instantiated core, unit or block with an input buffer 402. For a chip-level interconnect signal being routed to port A 404 of buffer 402, it may have been determined that a decision-making element delay does not disrupt timing closure for the instantiated core. A selection signal is added to the pinout of buffer 402 with port A ctl 406, which may decide whether or not a delay will be added to the interconnect signal. At the time of placement of instantiated buffer 402 at the chip-level, a chip-level connection to a chip-level power signal, Vdd, or to a chip-level ground signal, Gnd, may be used to permanently select the desired version of the interconnect signal for use by the interior of buffer 402. If an added delay is required, the delay is supplied by delay element 408. In one embodiment, delay element 408 may be implemented by two inverters with transistors that are sized in a manner to provide a predetermined delay based on previous timing analysis. A decision-making element 410 may provide decision-making logic in order to determine if a delayed or non-delayed version of the interconnect signal should be supplied to port B 418 and to the interior logic and storage elements of the core. In one embodiment, the decision-making element may be a mux cell. In another embodiment, the inputs of the mux may be switched.

Figure 4B:
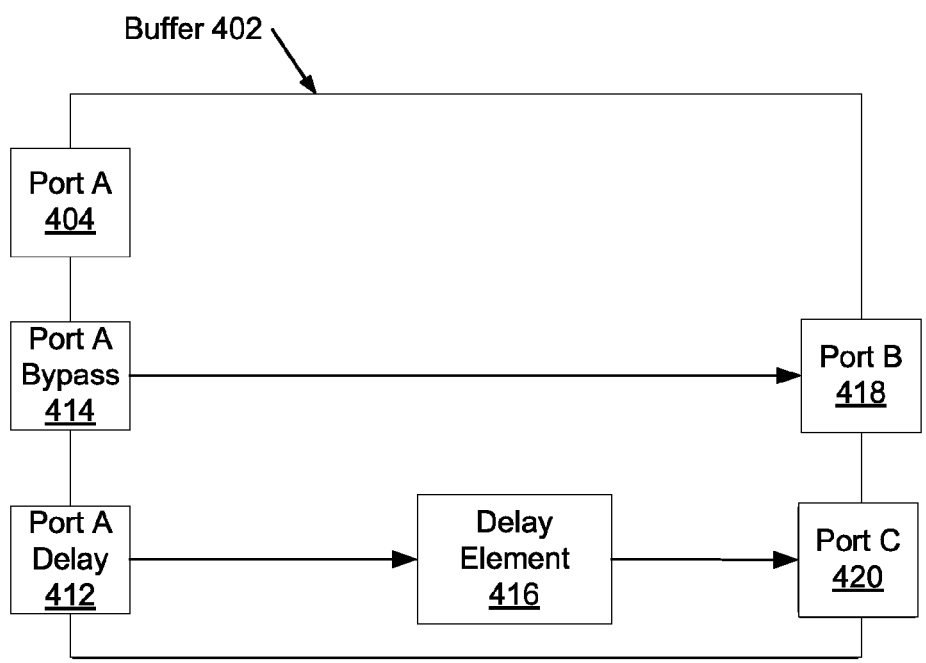
FIG. 4B is a generalized block diagram illustrating one embodiment of an input port with a jumper.

FIG. 4B illustrates another embodiment of a general block diagram of an interface 400 of an instantiated core, unit or block with an input buffer 402. Again, a chip-level interconnect signal may be routed to port A 404 of buffer 402. It may have been determined that a decision-making element delay does disrupt timing closure for the instantiated core. Rather than utilize a decision-making element, the delayed and non-delayed versions of the interconnect signal may be supplied to the interior of buffer 402 by a direct route. As stated above, the interconnect signal is routed at chip-level to port A 404. Two additional pins, port A delay 412 and port A bypass 414, are added to buffer 402. At the time of placement of instantiated buffer 402, a connection may be made between port A 404 and port A delay 412 or between port A 404 and port A bypass 414. This connection may be made using different metal layers of the chip. From timing analysis, if it was determined that an added delay is needed for this particular instantiated core, but without the delay of a mux 410 or other decision-making element, then a connection is made between port A 404 and port A delay 412, and also a connection is made between port C 420 and port A bypass 414. Depending on the results of the timing analysis, delay element 416 may or may not provide the same delay value as delay element 408. Again the connections may be made by using different metal layers of the chip.

However, from timing analysis, if it was determined that an added delay is not needed for this particular instantiated core, then a connection is made between port A 404 and port A bypass 414, and port A delay is connected to logic '0', or Gnd.

The connections between port A 404 and either port A delay 412 or port A bypass 414 may be performed by a jumper comprising metal. The metal may lie on the top layer of the chip or it may lie on a different layer where space is allocated for the jumper. Vias leading to the ports complete the connection in this case.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method comprising:
providing a plurality of blocks, each comprising a buffer with an input port configured to receive an input signal and an output port configured to convey an output signal corresponding to the input signal, wherein at least a first block of the plurality of blocks includes a buffer with a delay element which may or may not be utilized to generate the output signal corresponding to the input signal;
receiving said input signal at the first block and a second block of the plurality of blocks, wherein the input signal is received by the first block at a first time, and the input signal is received by the second block at a second time;
selecting use of the delay element in the first block in response to determining the first time is less than the second time by at least a first predetermined difference;
selecting non-use of the delay element in the first block and selecting non-use of the delay element in the second block in response to determining the first time is not less than the second time by at least a second predetermined difference; and
wherein selecting use of the delay element comprises selecting a first path which includes the delay element between the input port and the output port, and wherein selecting non-use of the delay element comprises selecting a second path which does not include the delay element.

2. The method as recited in claim 1, wherein the second block includes a buffer with a delay element which may or may not be utilized to generate the output signal corresponding to the input signal, further comprising selecting non-use of the delay element in the second block in response to determining the first time is less than the second time by a third predetermined difference.

3. The method as recited in claim 1, further comprising utilizing a control signal to select between use and non-use of said delay element.

4. The method as recited in claim 3, further comprising:
utilizing a control port on the buffer to receive the control signal;
conveying a constant logic value to the control port of the first block in order to select use of the delay element in response to determining the first time is less than the second time by at least said predetermined difference; and
conveying a complementary constant logic value to the control port of the first block in order to select non-use of the delay element in response to determining the first time is not less than the second time by said predetermined difference.

5. The method as recited in claim 1, further comprising utilizing metal jumpers between metal layers to select between use and non-use of said delay element.

6. The method as recited in claim 5, further comprising:
utilizing a bypass port on the buffer coupled to the output port;
utilizing a delay port on said buffer coupled to an input of the delay element;
utilizing an intermediate port on said buffer coupled to the output of the delay element;
connecting the input port to the delay port and the intermediate port to the bypass port via metal jumpers in response to determining the first time is less than the second time by at least said predetermined difference; and
connecting the input port to the bypass port via metal jumper and the delay port to logic value 0 in response to determining the first time is not less than the second time by said predetermined difference.

7. A system comprising:
a driver conveying an input signal;
a plurality of blocks, each comprising a buffer with an input port configured to receive the input signal and an output port configured to convey an output signal corresponding to the input signal, wherein at least a first block of the plurality of blocks includes a buffer with a delay element which may or may not be utilized to generate the output signal corresponding to the input signal;

wherein the input signal is received by the first block at a first time, and the input signal is received by a second block of the plurality of blocks at a second time;

wherein the buffer of the first block is configured to select use of the delay element in response to determining the first time is less than the second time by at least a first predetermined difference;

wherein the first block and the second block are further configured to select non-use of the delay element in response to determining the first time is not less than the second time by at least a second predetermined difference; and wherein selecting use of the delay element comprises selecting a first path with the delay element between the input port and the output port, and wherein selecting non-use of the delay element comprises selecting a second path that does not include the delay element.

8. The system as recited in claim 7, wherein the second block is further configured to:

include a buffer with a delay element which may or may not be utilized to generate the output signal corresponding to the input signal; and select non-use of the delay element in response to determining the first time is less than the second time by at least a third predetermined difference.

9. The system as recited in claim 7, wherein the buffer is further configured to utilize a control signal to select between use and non-use of said delay element.

10. The system as recited in claim 9, wherein the buffer is further configured to:

utilize a control port to receive the control signal;

maintain a constant logic value at the control port of the first block in order to select use of the delay element in response to determining the first time is less than the second time by at least said predetermined difference; and maintain a complementary constant logic value at the control port of the first block in order to select non-use of the delay element in response to determining the first time is not less than the second time by said predetermined difference.

11. The system as recited in claim 7, wherein the buffer is further configured to utilize metal jumpers between metal layers to select between use and non-use of said delay element.

12. The system as recited in claim 11, wherein the buffer is further configured to:

utilize a bypass port coupled to the output port;

utilize a delay port coupled to an input of the delay element;

utilize an intermediate port coupled to the output of the delay element;

maintain via metal jumpers a connection between the input port and the delay port and between the intermediate port and the bypass port in response to determining the first time is less than the second time by at least said predetermined difference; and maintain via metal jumpers a connection between the input port and the bypass port and between the delay port and logic value 0 in response to determining the first time is not less than the second time by said predetermined difference.

13. A buffer comprising:

an input port configured to receive an input signal;

an output port configured to convey an output signal corresponding to the input signal;

a delay element which may or may not be utilized to generate the output signal;

circuitry configured to:

select use of the delay element in response to determining a first timing requirement of the input signal is met;

select non-use of the delay element in response to determining a second timing requirement is not met; and wherein selecting use of the delay element comprises including the delay element in a path between the input port and the output port, and wherein selecting non-use of the delay element comprises not including the delay element in said path.

14. The buffer as recited in claim 13, wherein the buffer is further configured to utilize a control signal to select between use and non-use of said delay element.

15. The buffer as recited in claim 14, wherein the buffer is further configured to:

utilize a control port to receive the control signal;

maintain a constant logic value at the control port in order to select use of the delay element in response to determining the timing requirement is met; and maintain a complementary constant logic value at the control port in order to select non-use of the delay element in response to determining the timing requirement is not met.

16. The buffer as recited in claim 13, wherein the buffer is further configured to utilize metal jumpers between metal layers to select between use and non-use of said delay element.

17. The buffer as recited in claim 16, wherein the buffer is further configured to:

utilize a bypass port coupled to the output port;

utilize a delay port coupled to an input of the delay element;

utilize an intermediate port coupled to the output of the delay element;

maintain via metal jumpers a connection between the input port and the delay port and between the intermediate port and the bypass port in response to determining the timing requirement is met; and maintain via metal jumpers a connection between the input port and the bypass port and between the delay port and logic value 0 in response to determining the timing requirement is not met.

* * * * *